US008797594B2

(12) United States Patent
Komatsu et al.

(10) Patent No.: US 8,797,594 B2
(45) Date of Patent: Aug. 5, 2014

(54) INKJET PRINTER AND METHOD FOR FORMING AN AUXILIARY LAYER BASED ON MEDIUM TYPE

(75) Inventors: Minoru Komatsu, Kyoto (JP); Makoto Narazaki, Kyoto (JP); Toru Kawada, Kyoto (JP)

(73) Assignee: Dainippon Screen Mfg. Co., Ltd, Kyoto (JP)

( * ) Notice: Subject to any disclaimer, the term of this patent is extended or adjusted under 35 U.S.C. 154(b) by 198 days.

(21) Appl. No.: 13/358,243

(22) Filed: Jan. 25, 2012

(65) Prior Publication Data

US 2012/0194872 A1 Aug. 2, 2012

(30) Foreign Application Priority Data

Jan. 31, 2011 (JP) ................................. P2011-17824

(51) Int. Cl.
*H04N 1/60* (2006.01)

(52) U.S. Cl.
USPC ................ 358/1.9; 358/3.23; 347/14; 347/15

(58) Field of Classification Search
None
See application file for complete search history.

(56) References Cited

U.S. PATENT DOCUMENTS 7,147,296 B2 * 12/2006 Kakutani ........................ 347/15
7,397,580 B2 * 7/2008 Kakutani ....................... 358/1.9
7,859,715 B2 * 12/2010 Yamamoto et al. ............ 358/1.9
2003/0218656 A1 11/2003 Yamazaki et al.
2005/0046684 A1 3/2005 Yoneyama
2005/0057594 A1 * 3/2005 Kakutani ........................ 347/15
2005/0122353 A1 6/2005 Yamazaki et al.
2005/0122368 A1 6/2005 Yamazaki et al.
2005/0243121 A1 11/2005 Onishi
2006/0158494 A1 * 7/2006 Yamanobe ...................... 347/96
2007/0188547 A1 8/2007 Kobayashi et al.
2007/0211097 A1 9/2007 Yamazaki et al.
2009/0315926 A1 12/2009 Yamanobe
2010/0302299 A1 12/2010 Kobayashi et al.
2011/0032299 A1 * 2/2011 Mimura .......................... 347/15
2011/0242556 A1 * 10/2011 Jinno et al. ..................... 358/1.9
2012/0056926 A1 * 3/2012 Mitsuzawa ...................... 347/14

FOREIGN PATENT DOCUMENTS

JP 08-216498 8/1996
JP 2004-1410 1/2004
JP 2004-188658 A 7/2004
JP 2007-50555 3/2007
JP 2010-173149 A 8/2010

OTHER PUBLICATIONS

European Search Report issued in European Patent Application No. 12000238.1 dated May 16, 2012.

* cited by examiner

*Primary Examiner* — Dung Tran
(74) *Attorney, Agent, or Firm* — McDermott Will & Emery LLP

(57) ABSTRACT

An inkjet printer includes an image-forming part, forming an auxiliary layer on a base material by ejecting droplets of auxiliary ink and forming an image on the auxiliary layer by ejecting droplets of image-forming ink, the auxiliary ink changing a dot formation state of droplets of the image-forming ink. In a storage part, a reference table that associates each of a plurality of types of base materials with a proper dot area rate to be used when forming the auxiliary layer is stored. In a dot-area-rate determination part, a dot area rate to be used when forming the auxiliary layer on a target base material is determined as an auxiliary ink dot area rate by referencing the reference table using the type of the target base material. This enables the inkjet printer to form a highly precise image on various base materials.

16 Claims, 6 Drawing Sheets

| Paper Type | Basis Weight [g/m²] | Proper Dot Area Rate [%] |
|---|---|---|
| Woodfree Paper | 64 | 15 |
| | 81.4 | 25 |
| | 104.7 | 30 |
| Newspaper | ・・・ | ・・・ |
| | ・・・ | ・・・ |
| | ・・・ | ・・・ |
| Coated Paper | ・・・ | ・・・ |
| | ・・・ | ・・・ |
| | ・・・ | ・・・ |

FIG. 7

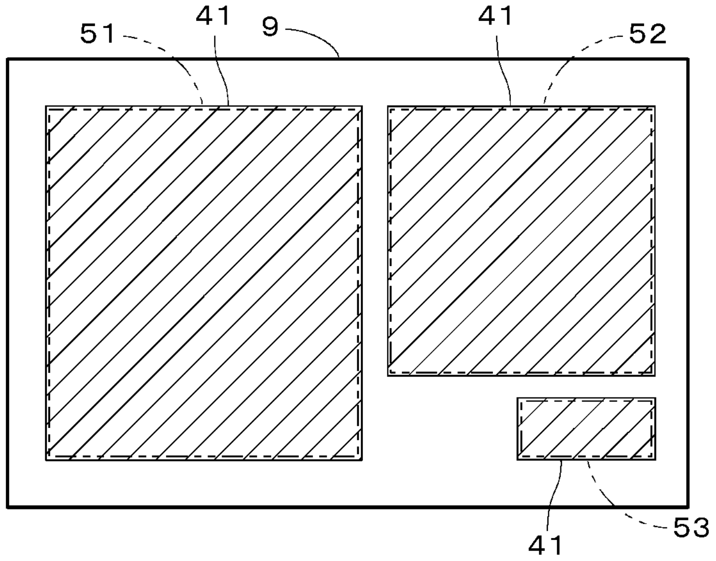

FIG. 8

<table>
<tr><th>Paper Type</th><th>Basis Weight [g/m²]</th><th>Image Attribute</th><th>Proper Dot Area Rate [%]</th></tr>
<tr><td rowspan="6">Newspaper</td><td rowspan="3">...</td><td>Picture</td><td>...</td></tr>
<tr><td>Character</td><td>...</td></tr>
<tr><td>Barcode</td><td>...</td></tr>
<tr><td rowspan="3">...</td><td>Picture</td><td>...</td></tr>
<tr><td>Character</td><td>...</td></tr>
<tr><td>Barcode</td><td>...</td></tr>
</table>

INKJET PRINTER AND METHOD FOR FORMING AN AUXILIARY LAYER BASED ON MEDIUM TYPE

TECHNICAL FIELD

The present invention relates to an inkjet printer that forms an image on a base material by ejecting ink droplets toward the base material, and an image forming method for an inkjet printer.

BACKGROUND ART

In recent years, forming of images on various base materials using an inkjet system has been performed. For example, Japanese Patent Application Laid-Open No. 2007-50555 (Document 1) discloses a technique in which, in the case where an image is printed with an inkjet printer on a medium such as a cloth material, a metal plate or leather on which it is difficult to directly stabilize and print an image, an undercoat layer for image fixing is printed on the medium with droplets of ink for undercoat-layer printing that are ejected from an inkjet head, and an image is overprinted on the surface of that undercoat layer with droplets of ink for image printing that are ejected from an inkjet head.

Incidentally, in the case where an undercoat layer for image fixing is formed on a base material (medium) and an image is formed on the undercoat layer with ink for image printing as in the technique of Document 1, ink droplets for undercoat-layer printing are applied to the base material with a 100% dot area rate (in other words, ink droplets are applied to all positions on the base material to which ink droplets can be applied). In this case, however, cockling (a phenomenon in which wrinkles are created) may occur if the base material is paper, or depending on the type of the base material, the ink for image printing may not be fixed appropriately on the undercoat layer, and as a result, the accuracy of an image to be formed on the undercoat layer decreases.

SUMMARY OF INVENTION

The present invention is intended for an inkjet printer, and it is an object of the present invention to form a highly precise image on various base materials.

The inkjet printer according to the present invention includes an image-forming part that forms an auxiliary layer on a base material by ejecting droplets of an auxiliary ink toward the base material and forms an image on the auxiliary layer by ejecting droplets of an image-forming ink toward the base material, the auxiliary ink changing a dot formation state of droplets of the image-forming ink, a storage part that stores a reference table that associates each of a plurality of types of base materials with a proper dot area rate to be used when forming the auxiliary layer, and a dot-area-rate determination part that determines a dot area rate to be used when forming the auxiliary layer on a target base material on which an image is to be formed, as an auxiliary ink dot area rate, by referencing the reference table using a type of the target base material.

According to the present invention, it is possible to form a highly precise image on various base materials with the image-forming ink. It is also possible to suppress the amount of the auxiliary ink consumed.

According to a preferred embodiment of the present invention, the base material is paper, in the reference table, proper dot area rates are associated individually with a plurality of basis weights of each type of paper, and the dot-area-rate determination part determines the auxiliary ink dot area rate, by referencing the reference table additionally using a basis weight of paper serving as the target base material. This enables an image to be formed with higher accuracy.

According to another preferred embodiment of the present invention, the amount of the auxiliary ink consumed can be further suppressed by forming the auxiliary layer on only an image area that is preset as an area where an image is to be formed with the image-forming ink.

According to still another embodiment of the present invention, in the reference table, proper dot area rates are associated individually with a plurality of attributes of images to be formed on each type of base material, and the dot-area-rate determination part determines the auxiliary ink dot area rate, by referencing the reference table additionally using an attribute of an image to be formed on the target base material.

In this case, it is more preferable that, when a plurality of image areas where images are to be formed with the image-forming ink are preset on the target base material, the dot-area-rate determination part determines the auxiliary ink dot area rate for each image area, using an attribute of an image to be formed in that image area. This enables a highly precise image to be formed in each image area.

The present invention is also intended for an image forming method for an inkjet printer.

These and other objects, features, aspects, and advantages of the present invention will become more apparent from the following detailed description of the present invention when taken in conjunction with the accompanying drawings.

BRIEF DESCRIPTION OF DRAWINGS

FIGS. 6 and 7 are diagrams each showing an auxiliary layer formed on a target base material;

FIG. 8 is a diagram showing a part of another example of a reference table;

DESCRIPTION OF EMBODIMENTS

Figure 1:
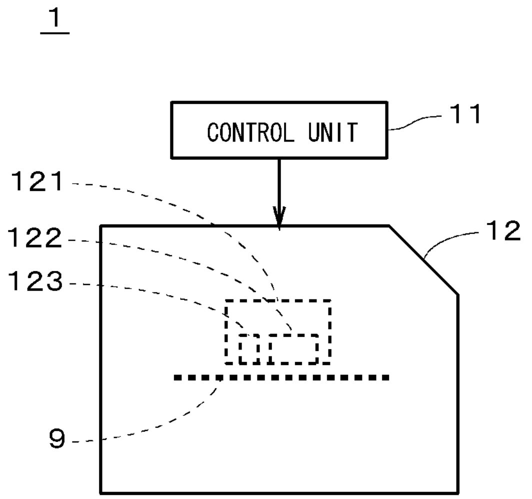
FIG. 1 is a diagram showing a constitution of an inkjet printer.

FIG. 1 is a diagram showing a constitution of an inkjet printer 1 according to a preferred embodiment of the present invention. The inkjet printer 1 is provided with a control unit 11 including a computer and the like, and an image-forming part 12 connected to the control unit 11. The image-forming part 12 receives signals from the control unit 11 and forms (prints) an image on a base material 9, which is paper, using an inkjet mechanism.

The image-forming part 12 includes an ejection part 121 that ejects minute ink droplets toward a main surface of the base material 9, and a moving mechanism (not shown) for moving the base material 9 in a horizontal direction relative to the ejection part 121. The ejection part 121 includes an image-forming head 122 that ejects droplets of image-forming inks that are water-based cyan (C), magenta (M), yellow (Y), and black (K) inks, and an auxiliary head 123 that ejects droplets of an auxiliary ink that is described later. In the image-forming part 12, respective positions of the base material 9 are placed successively under the auxiliary head 123 and then under the image-forming head 122 by the moving mechanism. As a result, an auxiliary layer is formed on the base material 9 with the auxiliary ink, and an image (hereinafter, also referred to as a "print image") is formed on the auxiliary layer with the image-forming inks. Note that inks of colors (such as light cyan and light magenta) other than the C, M, Y, and K may be ejected from the image-forming head 122.

Here, the auxiliary ink will be described. For example, in the case where the base material 9 is woodfree paper, if droplets of the water-based image-forming inks are directly applied to the main surface of the base material 9 (which is the front surface of the paper and hereinafter referred to as a "recording surface"), the size of dots that are formed with the droplets increases and also the colors of the dots darkens and cause degradation in color development, because the image-forming inks permeate (penetrate) into the recording surface of the woodfree paper while spreading thereon. In the case where the base material 9 is coated paper, if droplets of the water-based image-forming inks are directly applied to the recording surface of the base material 9, droplets applied to adjacent positions on the recording surface will mix together, forming large dots or mixing colors (that is, beading or intercolor bleeding occurs), because the image-forming inks spread widely over the recording surface of the coated paper without substantially penetrating into the recording surface.

The auxiliary ink is a transparent water-based ink that changes a dot formation state of droplets of the image-forming inks on the base material 9. By applying droplets of the image-forming inks to the auxiliary layer formed with the auxiliary ink under later-described conditions, the inkjet printer 1 realizes a state in which these droplets neither overspread nor overpenetrate (that is, a state in which the droplets are fixed, forming dots of a certain size on the surface of the base material 9, i.e., so-called "inkjet printability" is obtained). The auxiliary ink is also called an anchor ink or an undercoat ink, and the auxiliary layer is also called an anchor layer or an undercoat layer. The auxiliary ink used by the inkjet printer 1 may also be white or colored.

Figure 2:
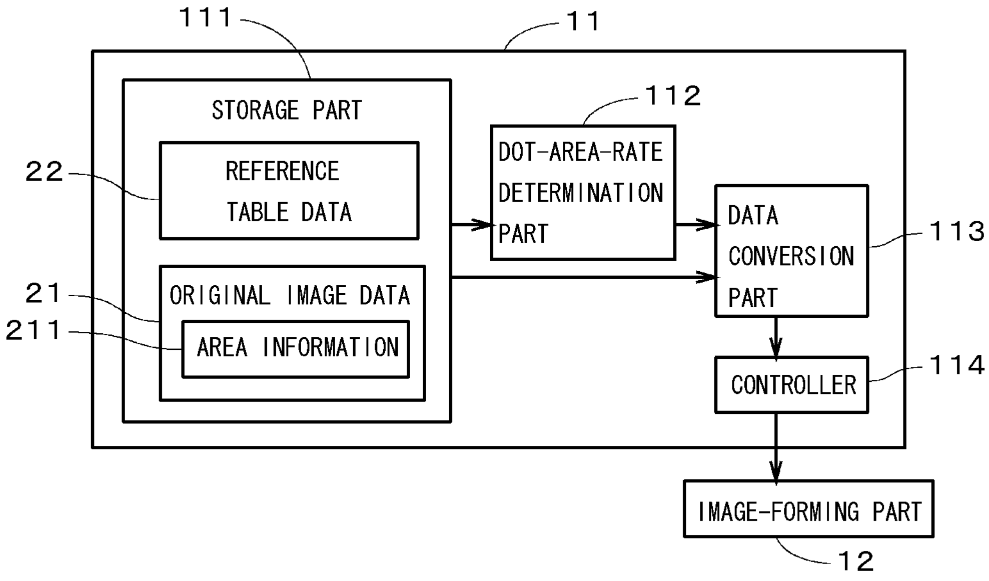
FIG. 2 is a block diagram showing a functional constitution of the inkjet printer.

FIG. 2 is a block diagram showing a functional constitution of the inkjet printer 1. The control unit 11 includes a storage part 111 that stores various types of data, a dot-area-rate determination part 112 that determines an auxiliary ink dot area rate described later, a data conversion part 113 that generates drawing data for image formation by performing screening processing (halftone processing) on image data using a predetermined threshold matrix (e.g., a threshold matrix for frequency-modulated (FM) screening), and a controller 114 that controls the image-forming part 12 in accordance with the drawing data. Data 21 that indicates an original color image to be recorded on the base material 9 with the image-forming inks (in the present preferred embodiment, this data is in raster format and is hereinafter referred to as "original image data") and data 22 that indicates a reference table that is referenced when forming the auxiliary layer (this data is hereinafter referred to as "reference table data") are stored in advance in the storage part 111.

Figures 3, 4:
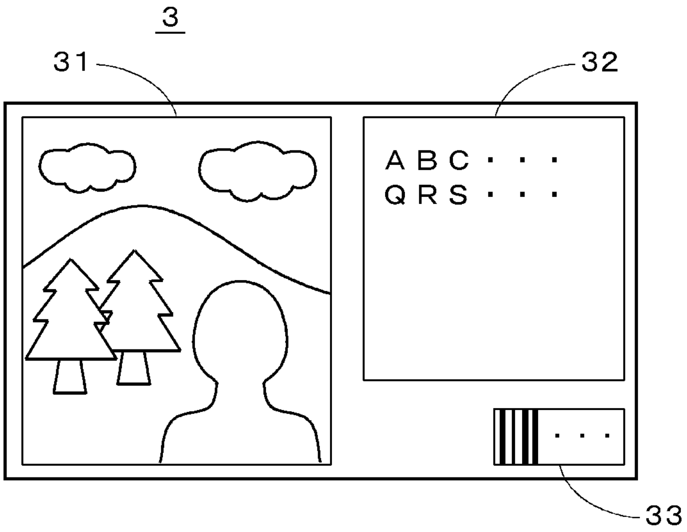
FIG. 3 is a diagram showing an original image.
FIG. 4 is a diagram showing a part of a reference table.

FIG. 3 is a diagram showing an original image 3 indicated by the original image data 21. A plurality of image areas (indicated by thin-line rectangles denoted by 31 to 33 in FIG. 3) are set in the original image 3, each of the image areas 31 to 33 being associated with an attribute such as picture, character or barcode that indicates the property of the image. Specifically, the image area 31 is associated with the attribute indicating a multi-tone picture image such as a photograph or an illustration, the image area 32 is associated with the attribute indicating a binary character image, and the image area 33 is associated with the attribute indicating a binary barcode image. Areas other than the image areas 31 to 33 in the original image 3 show up blank. The original image data 21 includes the positions and sizes of the image areas 31 to 33 (i.e., the numbers of pixels in longitudinal and lateral directions) and area information 211 indicating their attributes.

FIG. 4 is a diagram showing a part of the reference table indicated by the reference table data 22. In the reference table in FIG. 4, the left column denoted as "Paper Type" at the top shows the type of paper such as "woodfree paper", "newspaper", or "coated paper". The intermediate column denoted as "Basis Weight" at the top shows a plurality of basis weights (i.e., the weights of a base material per unit area) for each type of paper, and the right column denoted as "Proper Dot Area Rate" at the top shows a plurality of proper dot area rates that correspond respectively to the plurality of basis weights.

The term "dot area rate" as used in the present preferred embodiment refers to the proportion (dot occupancy rate) of pixels that have values indicating that a dot is to be formed, among pixels included in an area of predetermined size, in the image used in forming the auxiliary layer. In other words, the dot area rate is the proportion of the number of positions in which droplets are actually applied in an area of predetermined size on the base material 9 with respect to the total number of positions in which droplets of the auxiliary ink can be applied. In actuality, an auxiliary layer covering the entirety of the area will be formed with a dot area rate of less than 100%, because droplets of the auxiliary ink spread to some extent over the main surface of the base material 9.

The proper dot area rates in the reference table are the approximate minimum dot area rates for forming an auxiliary layer that will have the above-described inkjet printability (proper printability). In the present preferred embodiment, the proper dot area rate for each basis weight of each type of paper is determined in advance through the operation of creating a reference table, which will be discussed later. As described above, in the reference table, proper dot area rates to be used when forming the auxiliary layer are associated individually with a plurality of basis weights of each type of paper.

Figure 5:
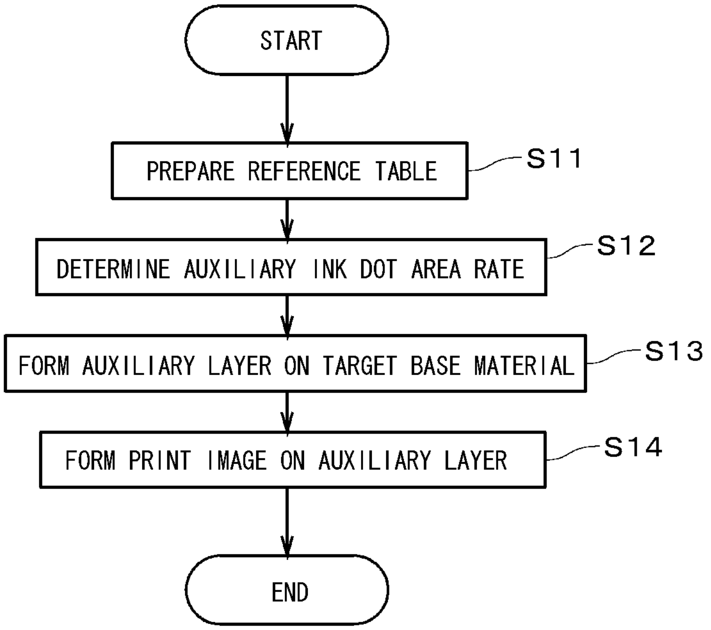
FIG. 5 is a flowchart showing a procedure of processing for forming an image on a base material.

FIG. 5 is a flowchart showing a procedure of processing performed by the ink jet printer 1 for forming a print image on the base material 9. In the inkjet printer 1, firstly, the reference table data 22 is generated through the reference-table creation operation described later and is stored in the storage part 111 in FIG. 2 in preparation (step S11).

Subsequently, the type of the base material 9 on which a print image is actually to be formed by the inkjet printer 1 (hereinafter, referred to as a "target base material 9") is input into the control unit 11. In the dot-area-rate determination part 112, a dot area rate (hereinafter, referred to as an "auxiliary ink dot area rate") to be used when forming the auxiliary layer on the target base material 9 is determined by referencing the reference table using the type and basis weight of the target base material 9 (step S12). For example, in the case where the type of the target base material 9 is woodfree paper and the basis weight of the target base material 9 is 81.4 g/m$^2$, the auxiliary ink dot area rate is determined automatically as 25% based on the reference table in FIG. 4. Then, data indicating an auxiliary layer image (this data is hereinafter referred to as "auxiliary layer image data") that is larger in size than the original image 3 and has uniform 25% gradation values (density values or pixel values) corresponding to the auxiliary ink dot area rate is output to the data conversion part 113. Note that the value of the auxiliary ink dot area rate may be specified arbitrarily by an operator, in which case it is possible to finely adjust the dot area rate specified by the type and basis weight of the target base material 9.

Note that the type and basis weight of the target base material 9 will agree with a type and a basis weight shown in the reference table, because the plurality of basis weights of each type of paper are determined in advance according to the application of printed matter. In an exceptional case where the basis weight of the target base material 9 does not agree with any of the base weights shown in the reference table, the proper dot area rate for the closest basis weight in the reference table to that of the target base material 9 may be determined as the auxiliary ink dot area rate. Or a proper dot area rate corresponding to the basis weight of the target base material 9 may be obtained by an interpolation operation based on the proper dot area rates for the plurality of basis weights shown in the reference table. Alternatively, the relationship between the basis weight and the proper dot area rate for each type of paper may be represented by a function in the reference table.

The data conversion part 113 generates, from the auxiliary layer image data, drawing data for controlling ejection of the auxiliary ink, and the controller 114 controls the image-forming part 12 in FIG. 1 in accordance with that drawing data. Accordingly, droplets of the auxiliary ink are ejected from the auxiliary head 123 toward the base material 9 along with the movement of the base material 9 relative to the ejection part 121, and as a result, an auxiliary layer is formed on the target base material 9 (step S13).

Figure 6:
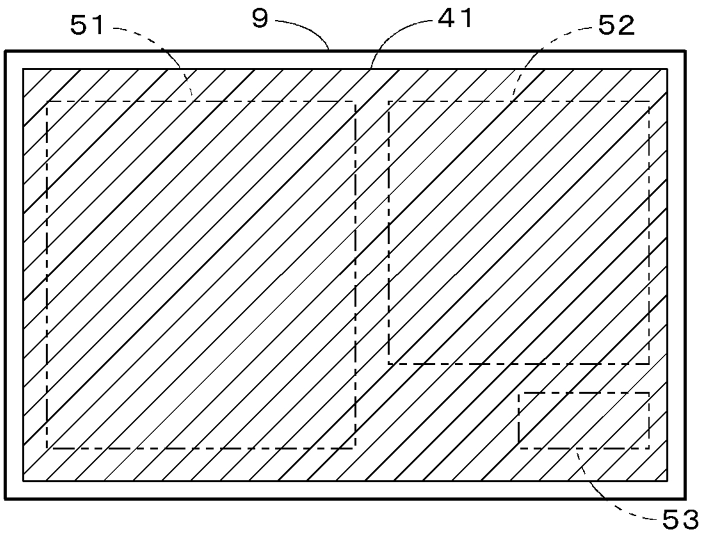

FIG. 6 is a diagram showing an auxiliary layer 41 formed on the target base material 9. In FIG. 6, diagonal hatching is added to the auxiliary layer 41 on the target base material 9, and areas of the target base material 9 (hereinafter, similarly referred as "image areas") on which images in the image areas 31 to 33 of the original image 3 in FIG. 3 are to be formed are indicated by chain-double-dashed-line rectangles denoted respectively by 51 to 53 (the same applies for FIGS. 7, 9, 11, and 12, which will be described later). In the inkjet printer 1, the transparent auxiliary layer 41 is formed by ejecting droplets of the auxiliary ink in accordance with the auxiliary ink dot area rate on approximately the entire area of the target base material 9 on which a print image can be formed with the image-forming inks (i.e., approximately the entire printable area).

The data conversion part 113 also generates, from the original image data 21, drawing data for controlling ejection of the image-forming inks, and the controller 114 controls the image-forming part 12 in FIG. 1 in accordance with that drawing data. Accordingly, droplets of the image-forming inks are ejected from the image-forming head 122 toward the base material 9 along with the movement of the base material 9 relative to the ejection part 121, and as a result, a color print image (i.e., a print image showing the original image 3) indicated by the original image data 21 is formed on the auxiliary layer 41 (step S14).

In the inkjet printer 1 of the present preferred embodiment, the target base material 9 continuously moves in a single horizontal direction. The auxiliary head 123 is disposed upstream of the image-forming head 122 in the travel direction of the target base material 9, and the auxiliary head 123 and the image-forming head 122 each have a plurality of outlets arranged along approximately the entire width of the target base material 9 (the width of the target base material 9 that is perpendicular to the travel direction thereof). Accordingly, respective positions of the base material 9 are placed successively under the auxiliary head 123 and then under the image-forming head 122, and the formation of the auxiliary layer 41 with the auxiliary ink in step S13 and the formation of the print image with the image-forming inks in step S14 are performed in parallel. After the entire image indicated by the original image data 21 is formed on the auxiliary layer 41, the image formation processing by the inkjet printer 1 is complete. Note that a drying part for drying a print image on the target base material 9 by infrared radiation or warm air may be provided downstream of the image-forming head 122 in the travel direction of the target base material 9.

Next, the operation of creating a reference table will be described. The reference-table creation operation involves preparing a plurality of base materials of each type and each basis weight, forming auxiliary layers with a plurality of different dot area rates on the plurality of base materials, and forming similar print images with the image-forming inks on the auxiliary layers formed on the plurality of base materials. The print images formed on the base materials are then observed and evaluated in terms of a plurality of evaluation items by an operator. Table 1 shows the results of the evaluation made on such print images on auxiliary layers that are formed with the dot area rates of 0%, 15%, 25%, 35%, 40%, 50%, 60%, 70%, and 100% on a base material, which is coated paper having a basis weight of 81.4 g/m$^2$.

TABLE 1

| | Dot Area Rate [%] | | | | | | | | |
|---|---|---|---|---|---|---|---|---|---|
| Evaluation Item | 0 | 15 | 25 | 35 | 40 | 50 | 60 | 70 | 100 |
| Color Development | ○ | ○ | ○ | ○ | ○ | ○ | x | x | x |
| Beading | x | x | x | Δ | ○ | ○ | x | x | x |
| Inter-Color Bleeding | Δ | Δ | Δ | Δ | ○ | ○ | ○ | ○ | ○ |
| Barcode Readability | ○ | ○ | ○ | ○ | ○ | ○ | ○ | ○ | ○ |
| Character Quality | ○ | Δ | Δ | Δ | Δ | x | x | x | x |

In Table 1, the evaluation results in terms of each evaluation item are shown in three levels "○", "Δ", and "x", "○" indicating that the result is favorable, "Δ" indicating that the result is not favorable but falls within tolerance, and "x" indicating that the result goes out of tolerance. "Color Development" is evaluated by observing a print image area showing a picture image, the results of which show "○" for the dot area rates of 50% or less and "x" for the dot area rates of 60% or higher. This is because, if the dot area rate used when forming the auxiliary layer is 60% or higher, a moisture content on the recording surface of the base material due to the C, M, Y, and K image-forming inks and the auxiliary ink will increase excessively. As a result, a conveyor roller that is disposed downstream in the travel direction of the base material in the image-forming part 12 will abut against the recording surface before the image-forming inks dry, taking some of the image-forming inks on the recording surface.

"Beading" and "Inter-color Bleeding" are also evaluated by observing a print image area showing a picture image, the results of which both show "Δ" or "x" for the dot area rates of 35% or less. This is because, with a dot area rate of 35% or less, it is difficult to produce a state in which the auxiliary layer formed with the auxiliary ink covers the enter recording surface, and areas exit in which droplets of the image-forming inks spread on the recording surface and mix together (forming large dots). As for "Beading", the reason why the evaluation results for the dot area rates of 60% or higher are "x" is the same as that for "Color Development".

"Barcode Readability" is evaluated by observing a print image area showing a binary barcode image, the results of which show "○" for all of the dot area rates. "Character Quality" is evaluated by observing a print image area showing a binary character image, the results of which show "x" for the dot area rates of 50% or higher due to the influence of moisture content on the recording surface of the base material. In consideration of all of the evaluation items, the dot area rate of 40% showing the highest evaluation results is determined as the proper dot area rate in Table 1. Note that for woodfree paper, "Barcode Readability" and "Character Quality" in a range of low dot area rates decrease because droplets of the image-forming inks penetrate into the recording surface of the base material while spreading thereon.

From the viewpoint of suppressing the occurrence of cockling and the amount of the auxiliary ink consumed (wasted), the dot area rate to be used when forming the auxiliary layer is preferably set as low as possible. For this reason, the permissible lowest dot area rate is determined as the proper dot area rate while taking into consideration the evaluation results for all of the evaluation items. Accordingly, it can be said that the proper dot area rate is the approximate minimum dot area rate for forming the auxiliary layer with which droplets of the image-forming inks applied neither overspread nor overpenetrate (that is, inkjet printability is obtained). The evaluation items described above may include other items such as so-called "strike-through", which refers to ink passing through to the back surface side of the base material 9, or abrasiveness with which the degree of stripping of ink when other members rub against the print image surface is evaluated.

Through the above-described operation, the proper dot area rate for a base material of each type and each basis weight is determined, and the reference table in FIG. 4 is created. The reference table data 22 is stored in the storage part 111 and used for image formation processing by the inkjet printer 1.

As described above, in the inkjet printer 1, the reference table that associates individual proper dot area rates with a plurality of basis weights of each type of paper is stored in the storage part 111 and referenced by the dot-area-rate determination part 112, using the type and basis weight of the target base material 9, and, based on this reference table, the dot area rate to be used when forming the auxiliary layer 41 on the target base material 9 is determined as the auxiliary ink dot area rate. As a result, a highly precise print image can be formed with the image-forming inks on various base materials 9. Furthermore, with this inkjet printer 1, it is possible to form individual print images with high accuracy on a plurality of base materials on, for example, which similar images are offset printed by another offset printer (i.e., base materials for offset printing whose recording surfaces do not have inkjet printability).

In the inkjet printer 1, since the auxiliary ink dot area rate is determined according to the type and basis weight of the target base material 9, it is possible to suppress the occurrence of cockling and the amount of the auxiliary ink consumed (the cost of the auxiliary ink) as compared with the case where the auxiliary layer is always formed with a 100% dot area rate. Furthermore, in the case of providing a drying part for drying a print image on the target base material 9, it is possible to drive the drying part with low power because of reduced moisture content on the recording surface, and to thereby reduce the power consumption of the drying part.

Incidentally, if the auxiliary layer was formed to the same size as the original image on base material 9, there would be the possibility that, depending on ink landing accuracy, the accuracy of conveying the base material 9 or the like in the inkjet printer 1, it may become difficult to accurately overlay the auxiliary layer formed by the auxiliary head 123 and the print image formed by the image-forming head 122, and as a result, a shift in the positions where the images (auxiliary layer and print image) are formed may occur between the auxiliary head 123 and the image-forming head 122. In this case, strike-through may occur depending on the type of the base material 9 as a result of the inks penetrating through to the back surface side of the base material 9 at the outer edge of the print image.

In contrast, with the inkjet printer 1, the dot-area-rate determination part 112 generates the auxiliary layer image that is larger than the original image 3. Thus, even if a shift in the positions where the images are formed occurs between the auxiliary head 123 and the image-forming head 122, it is possible to reliably form the entire print image showing the original image 3 on the auxiliary layer 41 and to thereby prevent the occurrence of strike-through.

In the above-described exemplary processing, although the auxiliary layer 41 is formed on approximately the entire printable area of the recording surface of the base material 9, the auxiliary layer 41 may be formed on only each area of the base material 9 that corresponds to the image area 31 to 33 of the original image 3 in FIG. 3. In this case, the dot-area-rate determination part 112 in FIG. 2 references the area information 211 included in the original image data 21 and generates auxiliary layer image data in which gradation values in areas that are in the same (center) positions as the image areas 31 to 33 of the original image 3 and are slightly larger than the image areas 31 to 33 are a uniform value corresponding to the auxiliary ink dot area rate, whereas gradation values in the other areas are 0. Then, as a result of the image-forming part 12 being controlled in accordance with drawing data generated from the auxiliary layer image data, the auxiliary layers 41 are formed on only image areas 51 to 53 of the base material 9 that correspond respectively to the image areas 31 to 33 as shown in FIG. 7 (to be precise, on only areas that are slightly larger than the image areas 51 to 53 in both longitudinal and lateral directions in FIG. 7).

As described above, the inkjet printer 1 enables the occurrence of cockling and the amount of the auxiliary ink consumed to be further suppressed by forming the auxiliary layer 41 on only each image area 51 to 53 that is preset as an area where an image is to be formed with the image-forming inks. Furthermore, the occurrence of strike-through can be prevented by forming the auxiliary layer 41 on the area that includes the entirety of the image area 51 to 53.

Next, other exemplary processing performed by the inkjet printer 1 will be described. FIG. 8 is a diagram showing a part of a reference table prepared in the present exemplary processing. In the reference table in FIG. 8, a column denoted as "Image Attribute" at the top is added to the reference table in FIG. 4. This column shows image attributes such as "picture", "character", and "barcode", and the column denoted as "Proper Dot Area Rate" shows the proper dot area rate for each image attribute. In this way, in the reference table in FIG. 8, proper dot area rates are associated individually with a plurality of attributes of images to be formed on a base material of each type and each basis weight. Note that although only "Newspaper" is given under "Paper Type" in FIG. 8, in actuality, a proper dot area rate is also defined for each image attribute for each basis weight of other types of base materials such as "woodfree paper" and "coated paper". Also, attributes other than "picture", "character", and "barcode" may be added in the reference table.

In the present exemplary processing, the reference table in FIG. 8 is prepared using a technique similar to that used in the aforementioned reference-table creation operation (FIG. 5: step S11). Specifically, the proper dot area rate for each image attribute is determined by forming auxiliary layers with a plurality of dot area rates on a plurality of base materials of each type and each basis weight and observing print images of a plurality of attributes formed on the auxiliary layers.

Subsequently, the dot-area-rate determination part 112 determines individual auxiliary ink dot area rates for the image areas 31 to 33 by referencing the reference table in FIG. 8, using the attributes of the respective image areas 31 to 33 included in the area information 211 of the original image data 21, in addition to the type and basis weight of the target base material 9 (step S12). Then, auxiliary layer image data is generated in which gradation values in an area that is in the same position as each image area 31 to 33 and is slightly larger than the image area 31 to 33 are a uniform value corresponding to the auxiliary ink dot area rate for the image area 31 to 33, whereas gradation values in the other areas are 0.

Figure 9:
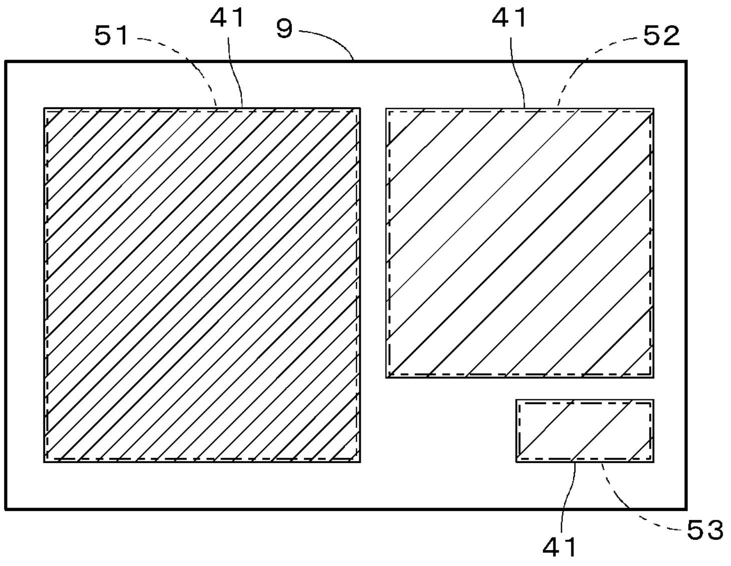
FIG. 9 is a diagram showing an auxiliary layer formed on a target base material.

In the inkjet printer 1, as a result of the image-forming part 12 being controlled in accordance with drawing data generated from the auxiliary layer image data, the auxiliary ink is ejected in accordance with the auxiliary ink dot area rates determined for the image areas 31 to 33 on the image areas 51 to 53 of the base material 9 corresponding to the image areas 31 to 33 of the original image 3, and accordingly the auxiliary layers 41 are formed as shown in FIG. 9 (step S13). In FIG. 9, different dot area rates used when forming the plurality of auxiliary layers 41 are expressed by differentiating the intervals of diagonal hatching added to the auxiliary layers 41 (the same applies for FIG. 11, which will be described later).

Furthermore, as a result of the image-forming part 12 being controlled in accordance with drawing data generated from the original image data 21, the images in the image areas 31 to 33 are formed on the corresponding auxiliary layers 41 with the image-forming inks (step S14).

As described above, in the reference table of the present exemplary processing, the proper dot area rates are associated individually with a plurality of attributes of images to be formed on a base material of each type and each basis weight. Furthermore, the plurality of image areas 51 to 53 where images are to be formed with the image-forming inks are preset on the target base material 9, and the dot-area-rate determination part 112 determines the auxiliary ink dot area rates for the respective image areas 51 to 53 by referencing the reference table using the type and basis weight of the target base material 9 and the attributes of images to be formed on the respective image areas 51 to 51 of the target base material 9. This enables the inkjet printer 1 to form a highly precise print image on each of the image areas 51 to 53. Furthermore, the occurrence of cockling and the amount of the auxiliary ink consumed can be suppressed by forming the auxiliary layer 41 on only each image area 51 to 53 and the vicinity thereof.

In the exemplary processing using the reference table in FIG. 8, the dot area rate to be used when forming the auxiliary layer 41 on the image area 51 showing the picture image may be partially changed in accordance with the picture image. Specifically, when generating the auxiliary layer image data, the dot-area-rate determination part 112 obtains a sum of gradation values of all the color components (C, M, Y, and K) at each position (pixel) in the image area 31 of the original image 3, which shows the picture image in FIG. 3. Furthermore, the relationship between the sum of the gradation values and the auxiliary ink dot area rate (hereinafter, the relationship is referred to as a "conversion curve") is prepared in advance as indicated by the solid line denoted by L1 in FIG. 10, and the auxiliary ink dot area rate at each position in the image area 31 showing the picture image is specified using the sum of the gradation values. As a result, an auxiliary layer image is generated in which the gradation value at each position in the image area 31 is a value corresponding to the specified auxiliary ink dot area rate (i.e., an auxiliary layer image in which the area corresponding to the image area 31 is expressed using multiple values).

Here, the conversion curve L1 in FIG. 10 will be described. Referring to the conversion curve L1, the auxiliary ink dot area rate progressively increases as the sum of the gradation values increases from 0 to T1, and is fixed at R1 for the sum of the gradation values being T1 or higher. When creating the conversion curve L1, the auxiliary ink dot area rate R1 is specified in the reference table in FIG. 8 from the type and basis weight of the target base material 9 and the picture image. As indicated by the chain double-dashed line denoted by L2 in FIG. 10, a primitive curve that is an increasing function is prepared in advance by testing for base materials of each type and each basis weight (in FIG. 10, the primitive curve L2 and the conversion curve L1 overlap in the range of the sum of the gradation values from 0 to T1), and the conversion curve L1 is created by changing to R1 the portion of the primitive curve L2 for which the auxiliary ink dot area rate is larger than R1.

Figure 11:
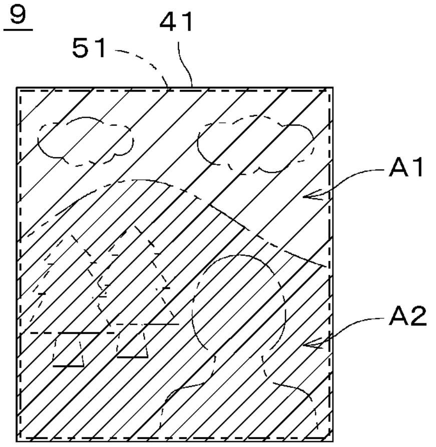
FIGS. 11 and 12 are diagrams each showing an auxiliary layer formed on a target base material.

FIG. 11 is a diagram showing the auxiliary layer 41 formed on the target base material 9 based on such auxiliary layer image data, which shows only the vicinity of the image area 51 of the target base material 9 corresponding to the image area 31 of the original image 3. In FIG. 11, the outline of the picture image formed in the image area 51 is indicated by the chain double-dashed lines. As described previously, the conversion curve L1 is an increasing function, and the auxiliary layer 41 is formed based on the auxiliary layer image data generated using the conversion curve L1. Accordingly, in a portion A1 of the picture image where the sum of the gradation values (the sum of the gradation values at each position in the portion A1) is relatively small, e.g., the portion indicating the sky in a landscape shot (the portion marked with broad diagonal hatching in FIG. 11, being a relatively bright portion because the target base material 9 is white), a lower dot area rate is used when forming the auxiliary layer 41 and a smaller amount of the auxiliary ink is applied to the portion A1. In such a portion A1, even if droplets of the image-forming inks spread over the recording surface, the quality of the print image is little affected because of the low number density of dots formed with the image-forming inks.

Meanwhile, in a portion A2 of the picture image in which the sum of the gradation values is relatively large (the portion marked with narrow diagonal hatching in FIG. 11), the dot area rate used when forming the auxiliary layer 41 corresponds to the auxiliary ink dot area rate R1. Accordingly, the accuracy of the print image in the portion A2 is ensured.

Figure 10:
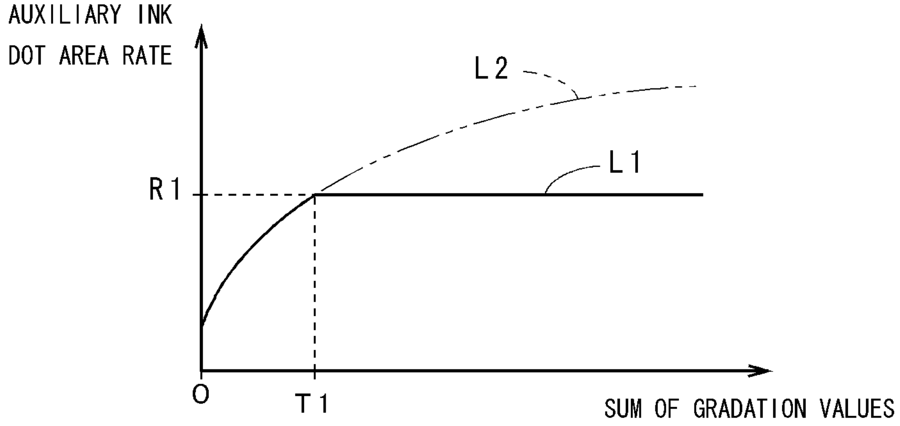
FIG. 10 is a diagram showing the relationship between the sum of gradation values and an auxiliary ink dot area rate.

As described above, with the inkjet printer 1 using the conversion curve L1 in FIG. 10, in an image area that is set as an area where a multi-tone picture image is to be formed, the auxiliary ink dot area rate is reduced in a portion of the picture image in which the sum of the gradation values is less than a predetermined value. This enables the amount of the auxiliary ink consumed to be further suppressed while maintaining the accuracy of a print image. Furthermore, it is possible to acquire high-quality printed matter because the occurrence of cockling or the like is suppressed as well. The technique using the conversion curve L1 in FIG. 10 may be used for an image area that shows a single-color picture image. In this case, in the image area showing a picture image, the auxiliary ink dot area rate is reduced in a portion where the gradation value (at each position) in the picture image is less than a predetermined value.

Incidentally, if the auxiliary layer image data was generated in accordance with the primitive curve L2 in FIG. 10, cockling or strike-through would easily occur in a portion where the sum of the gradation values is large in the case of a multi-color picture image, or the gradation value is large in the case of a single-color picture image (i.e., in a high density portion), because of an increase in the amounts of both the auxiliary ink applied and the image-forming inks applied. However, with the inkjet printer 1, the occurrence of cockling or strike-through can be suppressed by obtaining the conversion curve L1 in which the upper limit is set to the auxiliary ink dot area rate R1 that has been specified by the type and basis weight of the target base material 9 as well as the image attribute.

In the exemplary processing using the reference table in FIG. 8, for the image areas 52 and 53 such as a character image or a barcode image (hereinafter, referred to as a "line image") that show a binary image represented by line portions, the auxiliary layer 41 may be formed with dot area rates that are changed in accordance with the line image. Specifically, when generating the auxiliary layer image data, the dot-area-rate determination part 112 generates an image obtained by performing thickening processing (dilation processing) on line portions of the line images in the image areas 32 and 33. The dot-area-rate determination part 112 further determines the auxiliary ink dot area rates based on the type and basis weight of the target base material 9 and the image attributes of the image areas 32 and 33, and generates auxiliary layer image data in which gradation values in portions corresponding to the thickened line portions are values corresponding to the auxiliary ink dot area rates, whereas gradation values in portions other than the line portions in the line images are 0.

Figure 12:
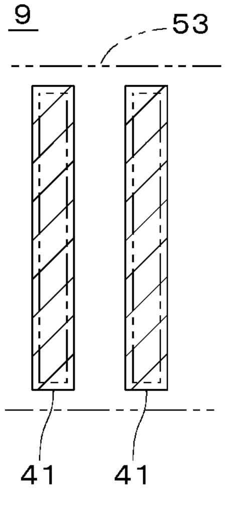

FIG. 12 is a diagram showing the auxiliary layer 41 formed on the target base material 9 based on auxiliary layer image data, which shows only the vicinity of the image area 53 of the target base material 9 corresponding to the image area 33 of the original image 3. In FIG. 12, the outlines of barcode images formed in the image area 53 are indicated by the chain double-dashed lines. As shown in FIG. 12, the auxiliary layers 41 are formed only in the areas where the line portions of the line image are dilated, as a result of controlling the ejection of the auxiliary ink based on the above auxiliary layer image data.

As described above, with the preferable inkjet printer 1, in an image area that is set as an area where a line image is to be formed, the auxiliary ink dot area rate is set to 0 in a portion excluding line portions in the line image and the vicinity of the line portions. Accordingly, even if a shift in the positions where images are formed occurs between the auxiliary head 123 and the image-forming head 122 due to the low accuracy of conveying a base material in the inkjet printer 1, it is possible to reliably form a line portion of a line image on the auxiliary layer 41 and to thereby suppress the occurrence of strike-through. It is also possible to further suppress the occurrence of cockling and the amount of the auxiliary ink consumed.

Furthermore, the inkjet printer 1 may generate auxiliary layer image data indicating that gradation values in a portion corresponding to a line portion that has undergone thickening processing are a value corresponding to the auxiliary ink dot area rate, whereas gradation values in a portion other than the line portion in the line image are less than that value and larger than 0. In this way, the occurrence of cockling or the like and the amount of the auxiliary ink consumed can be suppressed to some extent even if, in the image area of a line image, the auxiliary ink dot area rate is reduced in a portion excluding a line portion in the line image and the vicinity of the line portion.

While the above has been a description of preferred embodiments of the present invention, the present invention is not intended to be limited to the above-described preferred embodiments, and various modifications are possible.

For example, in the case where there is only a small difference in proper dot area rate between different basis weights of a base material, the basis weight may be omitted from the reference table in FIG. 4 (the same applies for the reference table in FIG. 8). In other words, a print image that is highly precise to some extent can be formed even if only a reference table that associates a plurality of types of base materials with proper dot area rates to be used when forming the auxiliary layer is prepared and the auxiliary ink dot area rate is determined by referencing that reference table using only the type of the target base material. However, in order to form a highly precise print image with the inkjet printer 1, it is preferable that the basis weight of the target base material 9 and/or the image attribute be additionally used to determine the auxiliary ink dot area rate.

Depending on ink landing accuracy, the accuracy of conveying the base material 9 and the like in the inkjet printer 1, the auxiliary layer may be formed to the same size as each image area.

Although water-based inks (auxiliary ink and image-forming inks) are used in the above-described preferred embodiments, other types of ink such as ink having UV curability may be used to form the auxiliary layer on a target base material and to form a print image on the auxiliary layer. Even in the case of using other types of ink, it is possible, by preparing a reference table in accordance with the ink type, to form a highly precise print image.

The auxiliary layer and a print image to be formed on the auxiliary layer are not necessarily represented by FM screening, and may be represented by amplitude-modulated (AM) screening or the like. Furthermore, different threshold matrices may be used for the auxiliary layer image data and the original image data when generating drawing data. Also, drawing data may be generated using, for example, an error diffusion method in which a quantization error is distributed among neighboring pixels.

A base material on which a print image is to be formed with the inkjet printer 1 is not limited to paper, and may be a plastic film, a glass plate, a cloth, a metal plate, or other materials. With the inkjet printer 1 in which the auxiliary ink dot area rate is determined using a reference table, it is possible to form a highly precise print image on even such base materials.

The constitutions of the above-described preferred embodiments and the variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2011-17824 filed in the Japan Patent Office on Jan. 31, 2011, the entire disclosure of which is incorporated herein by reference.

| Reference Signs List | |
|---|---|
| 1 | inkjet printer |
| 9 | base material |
| 12 | image-forming part |
| 22 | reference table data |
| 41 | auxiliary layer |
| 51-53 | image area |
| 111 | storage part |
| 112 | dot-area-rate determination part |
| S11-S14 | step |

The invention claimed is:

1. An inkjet printer comprising:

an image-forming part that forms an auxiliary layer on a base material by ejecting droplets of an auxiliary ink toward said base material and forms an image on said auxiliary layer by ejecting droplets of an image-forming ink toward said base material, wherein said auxiliary ink changes a dot formation state of droplets of said image-forming ink, and said base material is paper;

a storage part that stores a reference table that associates each of a plurality of basis weights of base materials and each of a plurality of types of base materials with a proper dot area rate to be used when forming said auxiliary layer, wherein said proper dot area rate is a dot area rate for forming said auxiliary layer where droplets of said image-forming ink are fixed to form dots of a certain size, and said dot area rate is a dot occupancy rate in an area of predetermined size; and a dot-area-rate determination part that determines a dot area rate to be used when forming said auxiliary layer on a target base material on which an image is to be formed, as an auxiliary ink dot area rate, by referencing said reference table using a type and a basis weight of said target base material.

2. The inkjet printer according to claim 1, wherein, said auxiliary layer is formed on only an image area that is preset as an area where an image is to be formed with said image-forming ink.

3. The inkjet printer according to claim 1, wherein, in said reference table, proper dot area rates are associated individually with a plurality of attributes of images to be formed on each type of base material, and said dot-area-rate determination part determines said auxiliary ink dot area rate, by referencing said reference table additionally using an attribute of an image to be formed on said target base material.

4. The inkjet printer according to claim 3, wherein, a plurality of image areas where images are to be formed with said image-forming ink are preset on said target base material, and said dot-area-rate determination part determines said auxiliary ink dot area rate for each image area, using an attribute of an image to be formed in said each image area.

5. The inkjet printer according to claim 4, wherein, said auxiliary layer is formed on only said each image area and a vicinity of said each image area.

6. The inkjet printer according to claim 3, wherein, in an image area that is set as an area where a multi-tone picture image is to be formed, said auxiliary ink dot area rate is reduced in a portion where a gradation value in said picture image is less than a predetermined value.

7. The inkjet printer according to claim 3, wherein in an image area that is set as an area where a line image is to be formed, said auxiliary ink dot area rate is reduced in a portion other than a line portion in said line image and a vicinity of said line portion.

8. The inkjet printer according to claim 1, wherein, said proper dot area rate is the approximate minimum dot area rate for forming said auxiliary layer such that droplets of said image-forming ink applied neither overspread nor overpenetrate.

9. An image forming method for an inkjet printer, said inkjet printer comprising an image-forming part that forms an auxiliary layer on a base material by ejecting droplets of an auxiliary ink toward said base material and forms an image on said auxiliary layer by ejecting droplets of an image-forming ink toward said base material, said auxiliary ink changing a dot formation state of droplets of said image-forming ink, and said base material being paper;

said image forming method comprising the steps of:

a) preparing a reference table that associates each of a plurality of basis weights of base materials and each of a plurality of types of base materials with a proper dot area rate to be used when forming said auxiliary layer, wherein said proper dot area rate is a dot area rate for forming said auxiliary layer where droplets of said image-forming ink are fixed to form dots of a certain size, and said dot area rate is a dot occupancy rate in an area of predetermined size;

b) determining a dot area rate to be used when forming said auxiliary layer on a target base material on which an image is to be formed, as an auxiliary ink dot area rate, by referencing said reference table using a type and a basis weight of said target base material; and c) with said image-forming part, forming said auxiliary layer on said target base material in accordance with said auxiliary ink dot area rate and forming an image with said image-forming ink on said auxiliary layer.

10. The image forming method according to claim 9, wherein in said step c), said auxiliary layer is formed on only an image area that is preset as an area where an image is to be formed with said image-forming ink.

11. The image forming method according to claim 9, wherein in said reference table, proper dot area rates are associated individually with a plurality of attributes of images to be formed on each type of base material, and in said step b), said auxiliary ink dot area rate is determined, by referencing said reference table additionally using an attribute of an image to be formed on said target base material.

12. The image forming method according to claim 11, wherein a plurality of image areas where images are to be formed with said image-forming ink are preset on said target base material, and in said step b), said auxiliary ink dot area rate is determined for each image area, using an attribute of an image to be formed in said each image area.

13. The image forming method according to claim 12, wherein, in said step c), said auxiliary layer is formed on only said each image area and a vicinity of said each image area.

14. The image forming method according to claim 11, wherein, in an image area that is set as an area where a multi-tone picture image is to be formed, said auxiliary ink dot area rate is reduced in a portion where a gradation value in said picture image is less than a predetermined value.

15. The image forming method according to claim 11, wherein, in an image area that is set as an area where a line image is to be formed, said auxiliary ink dot area rate is reduced in a portion other than a line portion in said line image and a vicinity of said line portion.

16. The image forming method according to claim 9, wherein said proper dot area rate is the approximate minimum dot area rate for forming said auxiliary layer such that droplets of said image-forming ink applied neither overspread nor overpenetrate.

* * * * *